United States Patent [19]
Moody et al.

[11] Patent Number: 5,278,478
[45] Date of Patent: * Jan. 11, 1994

[54] PROGRAMMABLE PD SERVO-COMPENSATOR

[75] Inventors: Kristaan L. Moody, Nottingham; Paul W. Latham, II, Lee, both of N.H.

[73] Assignee: Allegro Microsystems, Inc., Worcester, Mass.

[*] Notice: The portion of the term of this patent subsequent to Sep. 14, 2010 has been disclaimed.

[21] Appl. No.: 912,383

[22] Filed: Jul. 13, 1992

[51] Int. Cl.$^5$ ............................................. G05B 11/01
[52] U.S. Cl. .................................. 318/560; 318/609; 318/610; 341/172; 341/150
[58] Field of Search ............... 307/520, 521; 333/173; 341/172, 150; 318/560, 609, 610

[56] References Cited

U.S. PATENT DOCUMENTS

| | | | |
|---|---|---|---|
| 4,383,228 | 5/1983 | Gaillard | 333/173 |
| 4,446,438 | 5/1984 | Chang et al. | 333/173 X |
| 4,520,283 | 5/1985 | Sasaki et al. | 307/520 |
| 4,644,304 | 2/1987 | Temes | 333/173 |
| 4,849,662 | 7/1989 | Holberg et al. | 307/520 |
| 4,937,578 | 6/1990 | Shioda | 341/150 |
| 4,956,831 | 9/1990 | Sarraf et al. | 360/78 |
| 5,111,204 | 5/1992 | Katzenstein | 341/150 |

OTHER PUBLICATIONS

Bipolar and MOS Analog Integrated Circuit Design, Alan B. Grebene, (John Wiley and Sons), 1984, pp. 703-739.
Special Purpose Linear Devices Databook, National Semiconductor 1989, pp. 4-15 through 4-35.
An Electrically-Programmable Switched Capacitor Filter, David J. Allstot et al., IEEE Jrnl. of Solid State Ckts., vol. SC-14 No. 6, Dec. 1979.

Primary Examiner—William M. Shoop, Jr.
Assistant Examiner—Karen Masih

[57] ABSTRACT

A programmable PD servo compensator has the transfer function of the combination of a standard PD compensator in tandem with a second order low pass filter. The programmable PD servo compensator consists simply of a biquad filter having a single complex zero and a pair of conjugate complex poles. This servo compensator is comprised of two tandem connected operational amplifiers, each with a capacitor connected output to input across it. The tandem connection is effected by one switched-capacitor resistor between the output of the first amplifier to the input of the second. Another switched-capacitor resistor is connected between the PD compensator input and the input of the first amplifier. Yet another switched capacitor is connected between the PD compensator output and the input of the first amplifier. Additionally, a poles Q-programming circuit branch includes a digitally-programmable capacitor array, and a zero programming circuit branch includes another digitally-programmable capacitor array connected in the filter for determining the S-plane position of the zero and determining the relative gains of the proportional and derivative components of the PD compensator output signal. This is therefore an analog-signal handling servo compensator with digital programmability and having high speed, stability and versatility.

10 Claims, 6 Drawing Sheets

PROGRAMMABLE PD SERVO-COMPENSATOR

BACKGROUND

This invention relates to servo compensators and more particularly relates to a digitally-programmable proportional-derivative (PD) analog-signal servo compensator, especially for use in computer disk drives.

A typical servo control system is one in which the performance of an electric motor is continuously controlled by an electrical control signal. A servo compensator is connected between the control signal input and the motor, and electrical feedback reflecting the status of the motor is subtracted from the control signal. The compensator improves the servo feedback loop stability and otherwise improves servo system performance, e.g. by being tailored to compensate the inertia, vibration frequency, etc. of the particular motor. Computer disk drives include one servo system to control rotation of the disk and another servo system to control the actuator motor that determines the radial location on the disk of the read/write head.

Proportional-derivative, PD, compensators refer to those that produce an output signal portion that is proportional to the control signal and another output signal portion that is the derivative of the control signal. A further refinement to a PD compensator results in the generation of the yet another output signal portion that is the integral of the control signal, in which case it is said to be a PID compensator.

PD and PID circuits are often connected with and thus combined with standard filter circuits as separate blocks to form a servo compensator. A particularly effective filter circuit for limiting and defining the bandpass of the combination is a biquad filter having the S-plane transfer function.

$$\frac{V_{out}}{V_{in}} = \frac{w_n^2}{S^2 + \frac{w_n}{Q} S + w_n^2}$$

and the combination of the filter with a PID circuit block to form a composite PID compensator has the form of $$\frac{V_{out}}{V_{in}} = -\left[ K_D S + K_P + K_I \frac{1}{S} \right] \frac{w_n^2}{S^2 + \frac{w_n}{Q} S + w_n^2}$$

For the PD composite compensator the transfer function is the same except the $K_I$ parameter has zero value.

Disk drive servo compensators have been implemented in the past either by analog circuits or by digital circuits. Digital signal processing are especially flexible and accurate. Because the algorithms are carried out in software, the user may change the algorithm variables at will. However, digital signal processing is very computation intensive and the interface code processing portion of the circuit has to schedule its time between servo and the rest of the disc drive functions. Also digital calculating methods require time for the processor to receive its input, process that input and send it to the output stage. For these reasons speed is not optimum in digital signal processing servo systems.

Analog disk drive servo compensators employ operational amplifiers, comparators, and many passive components. The sources of inaccuracy and drift in such components are legion; unpredictable amplifier offsets, non linearities with respect to current or signal amplitude, and parameter changes in all components with temperature. Although analog-signal servo compensators are fast, they lack the accuracy and flexibility of digital signal processing compensators.

It is therefore an object of the present invention to provide a digitally-programmable analog-signal servo compensator offering the superior speed of a conventional analog-signal compensator, and the stability, accuracy and flexibility approaching or equal to that of a conventional digital-signal-processing compensator.

SUMMARY OF THE INVENTION

A programmable PD servo compensator consists of a biquad filter having a single complex zero and a pair of conjugate complex poles. This servo compensator is comprised of two tandem connected operational amplifiers, each with a capacitor connected output to input across it. The tandem connection is effected by one switched-capacitor resistor between the output of the first amplifier to the input of the second. Another switched-capacitor resistor is connected between the PD compensator input and the input of the first amplifier. Yet another switched capacitor is connected between the PD compensator output and the input of the first amplifier.

Further, a poles Q-programming circuit means consists of a circuit branch that includes a digitally-programmable capacitor array connected in the filter for determining the Q of the pair of poles and thus the bandwidth of the filter and a zero programming circuit means consists of a circuit branch that includes a digitally-programmable capacitor array connected in the filter for determining the S-plane position of the zero and determining the relative gains of the proportional and derivative components of the PD compensator output signal.

The servo compensator of this invention is intended to be formed in an integrated circuit chip and the programmable elements thereof are intended to be supplied the appropriate digital programming signals preferably from an external microprocessor that is to receive its instructions from the user (e.g. the servo system designer). This microprocessor can also be connected to servo-motor velocity and position sensors and may, via digital programming signals to the servo compensator, make appropriate dynamic changes in the parameters of the compensator transfer function for enhanced performance during servo operation. And the filter bandwidth and Q may be adjusted as well is the relative strengths of the proportional and differential signal portions of this user programmable servo compensator may be made optimum with respect to a wide variety of servo motors and loads.

The servo compensator of this invention merges the PD servo compensation function with that of a second order biquad low pass filter, which two functions are conventionally only effected by use of separate PD compensator circuit and a first order filter circuit. The second order filter function in this invention is especially advantageous in a servo system because it provides improved phase response of frequency components within the filter bandwidth and it also more effectively rejects higher frequency components reducing the influence of high frequency resonances of the servo motor and mechanical load.

The PD servo compensator of this invention employs circuitry that is fully integratable in silicon, namely analog-signal manipulating circuits comprised of operational amplifiers, switched-capacitor resistors and digitally programmable capacitor arrays. And this PD servo compensator offers the significant speed advantage that analog-signal handling circuits, as opposed to digital-signal handling circuits, provide. Furthermore the stability of this compensator, with respect to variations in manufacturing processes and with respect to operating temperature changes, can be greatly enhanced and made comparable to the stability of digital-signal handling circuits, owing to the use of switched-capacitor resistors, fixed capacitors and programmable capacitor arrays int he compensator circuits of this invention wherein each compensator circuit transfer-function parameter and each constant is made up only of ratios of capacitors, ratios of resistors, and the switched-capacitor clock (sampling) frequency, which the user can supply from a clock source external to the integrated circuit compensator chip to any desired precision.

This analog signal handling compensator combines switched-capacitor resistors and programmable capacitor arrays in such a way that the key parameters of the compensator transfer functions are composed of ratios of capacitors, ratios of resistors, and the clock frequency that may be supplied from an external source at any degree of desired precision and stability, by the user. This compensator is also readily implemented in compact form in a silicon integrated circuit without the need for external discrete resistors or capacitors.

DESCRIPTION OF THE PREFERRED EMBODIMENTS

Description of Prior Art Circuits Incorporated in the Embodiments

Figure 1:
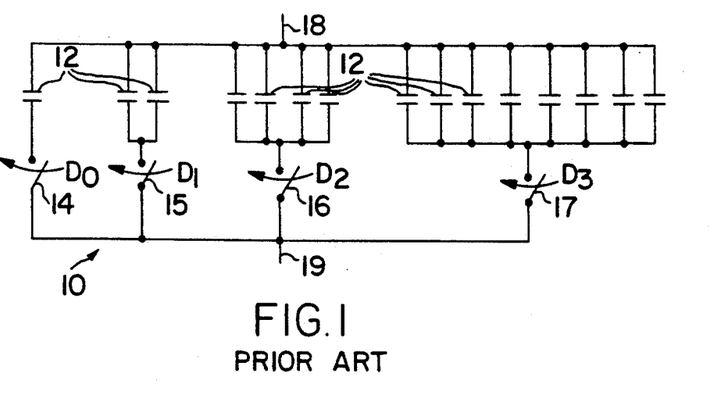
FIG. 1 shows a circuit diagram of a suitable digitally programmable capacitor array suitable for use in a notch filter circuit of this invention.

A digitally programmable capacitor array 19 in FIG. 1 is binary weighted, i.e. all of the capacitors 12 have the same capacitance value, C, and they are connected in binary groups of 1, 2, 4, etc. Electrically programmable switches 14, 15, 16 and 17 determine which groups of capacitors 12 contribute to the capacitance $C_A$ of the array 10 as measured between terminals 15 and 19.

The digital-signal-activated switches 14, 15, 16 and 17 are preferably implemented as MOS transistors (not shown). A switch to which a binary zero is applied opens, and a switch to which a binary 1 is applied closes to connect the switch-associated group of capacitors 12 between terminals 18 and terminal 19. Thus for example, when the digital control signal is 1/0/0/1, only switches 14 and 17 contribute to the array capacitance $C_A$ which is illustrated in the block diagram of FIG. 2. The corresponding decimal number is $N = D0 + 2D1 + 4D2 + 5D3 = 1 \cdot 1 + 2 \cdot 0 + 4 \cdot 0 + 5 \cdot 1 = 9$. Thus $C_A = (D0 + 2D1 + 4D2 + 8D3)C$, or $C_A = MC$, wherein M is the decimal number corresponding to the digital control signal that sets the switches 14 through 17.

For greater simplicity and clarity of presentation, the number of control bits shown in the drawing, m, is just 4 whereas a greater number of bits will usually be preferred. M can be any integer between 0 and $2^m - 1$. Thus, m=4, M can be any integer between 0 and 15.

Figure 2:
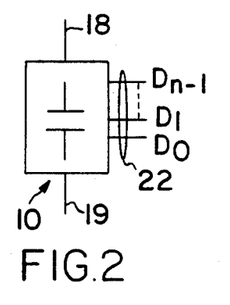
FIG. 2 shows a block-diagram representation of the capacitor array of FIG. 1.

The programmable capacitor array of FIG. 1 may be more simply represented by block 10 of FIG. 2, wherein the programmable-array capacitor 20 has the value $C_A$. The capacitor array 20 has a group 11 of digital control terminals to which the programming digital signal is to be applied.

Figure 3:
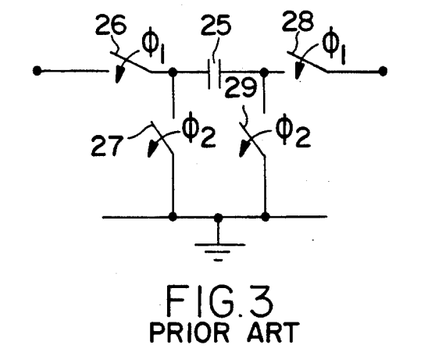
FIG. 3 shows a circuit diagram of a switched capacitor resistor.

The switched-capacitor resistor circuit of FIG. 3 simulates a resistor whose equivalent ohmic value is $R_s = 1/f_c \cdot C_s$ where $C_{is}$ is the capacitance of switched capacitor 25, and $f_c$ is the switches clock frequency, or sampling frequency. The two phases $\phi_1$ and $\phi_2$ of a two phase clock signal of frequency $f_c$ are applied as indicated in FIG. 3 to the clocked switches 26, 27, 28 and 29. With the four switches clocked as shown in FIG. 3, the resistor is said to be a positive switched capacitor resistor. As is known, a negative switched capacitor resistor is formed in the case that switches 25 and 29 are changed to be clocked respectively by clock phases $\phi_2$ and $\phi_1$ so that a positive input charge (signal) generates a negative output charge (signal).

EMBODIMENTS

Figure 4:
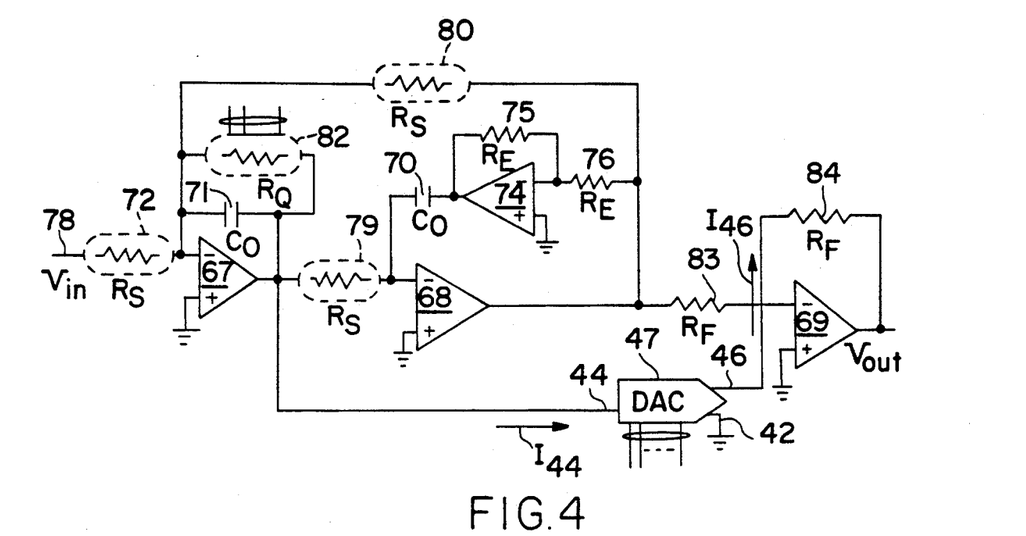
FIG. 4 shows a first proportional-derivative (PD) circuit of this invention.
Figure 5:
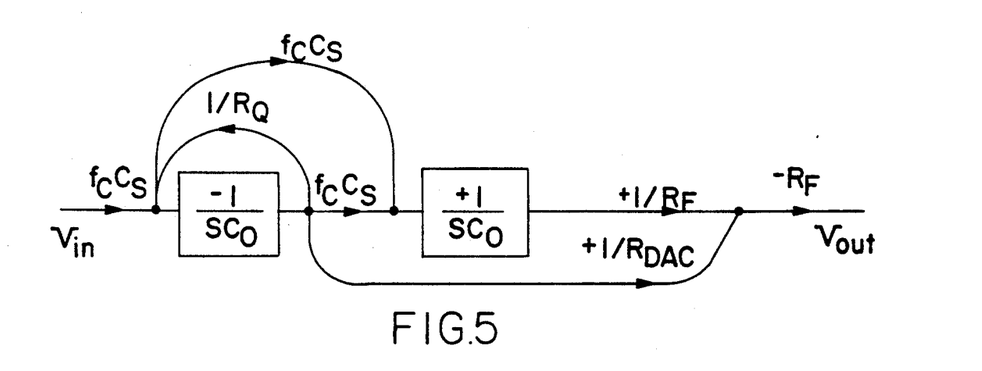
FIG. 5 shows flow diagram corresponding to the PD of FIG 4.

In a first embodiment of this invention, the circuit of FIG. 4 has three operational amplifiers 67, 68 and 69. Capacitors 71 and 70, each with value Co, are connected respectively across the amplifiers 67 and 68, input to output. That connection in the case of capacitor 70 is made through a unity gain opamp circuit consisting of amplifier 74 and two resistors 75 and 76, each of value $R_E$, and each being identically formed either as a diffused or a polysilicon type. This unity gain amplifier inverts the polarity of the signal through it so that the output of amplifier 68 is a positive function of Vin.

The analog signal Vin is applied to PD input conductor 78 that is connected via the switched-capacitor 72 resistor of value Rs to the input of the amplifier 67. Switched-capacitor resistors 79 and 80 also have the value Rs ohms. The switched-capacitor resistor 82 has a programmable ohmic value $R_Q$, which is accomplished by incorporating a programmable capacitor array of programmable value $C_Q$ in place of the usual fixed switched capacitor. The resistors 83 and 84 are also identical conventional diffused or polysilicon resistors, each of value $R_F$.

Figure 6:
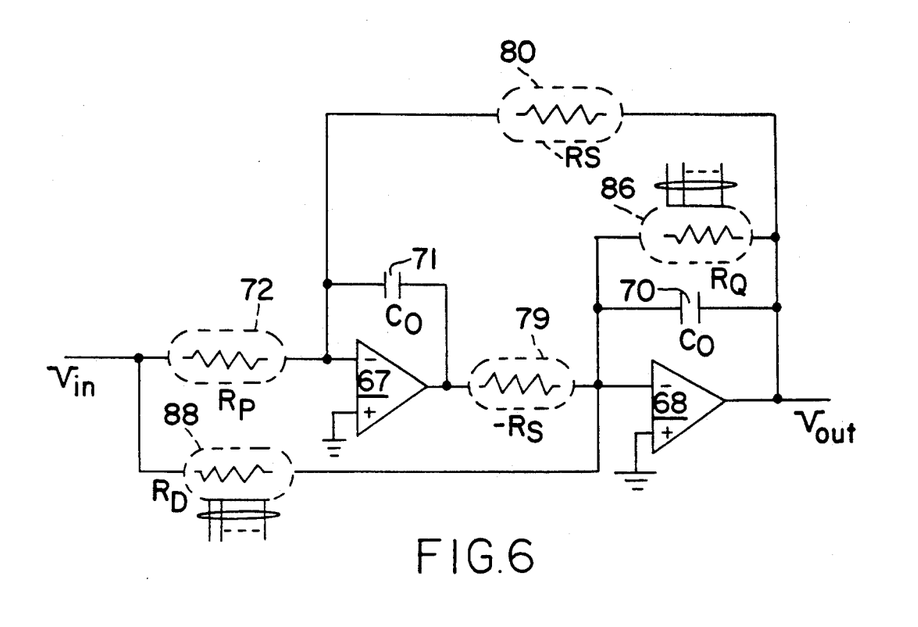
FIG. 6 shows a second PD circuit of this invention.

The DAC 47 is connected with terminal 44 serving as the current input terminal, and the terminal 46 as the output terminal. In the circuit of FIG. 4 this DAC becomes equivalent to a programmable resistor 47 of programmable value $R_F$ owing to the fact that its output is effectively shorted (terminal 46 to ground terminal 42) by the feedback via resistor 84 across amplifier 69 which keeps the voltage at the negative input of amplifier 69 at the essentially the same potential as is the positive grounded input terminal. This can be seen by considering that the ratio of DAC output current $I_{46}$ to DAC input current $I_4$ is $N/2^n$. Furthermore the DAC output current $I_{46}$ must flow through the feedback resistor 84, and the PD output voltage $v_{out}$ (from the amplifier 69) is $-I_{46} \cdot R_F$ or $$V_{out} = -I_{in} \frac{N}{2^n} R_F = \frac{V_{44}}{R} \frac{N}{2^n} R_F$$

where R is of the R/2R ladder DAC (FIG. 6), and $V_4$ is the voltage at the DAC input, terminal 44. This leads to $$\frac{V_{out}}{V_{44}} = -\frac{N}{2^n} \frac{R_F}{R} = -\frac{R_F}{R_{DAC}}$$

which makes $$R_{DAC} = R \frac{2^n}{N}.$$

The flow diagram for analysis of the PD circuit of FIG. 4 compensator transfer function Vout/Vin may be gotten as ratios of capacitors and ratios of resistors. In the transfer function a switched-capacitor resistor of value $R_x$ would incorporate a switched capacitor of value $C_x$; for example $R_s = 1/f_c C_s$.

$$\frac{V_{out}}{V_{in}} = -\frac{\left[f_c \frac{C_s}{C_o}\right]^2}{\frac{R_{DAC}}{R_F} \cdot f_c \frac{C_s}{C_o}} \cdot \frac{S + \frac{R_{DAC}}{R_F} \left[f_c \frac{C_s}{C_o}\right]^2}{S^2 + \frac{f_c \frac{C_s}{C_o}}{\frac{C_s}{C_Q}} S + \left[f_c \frac{C_s}{C_o}\right]^2}$$

wherein the position (corresponding to the frequency in radians) of the poles in the S-plane.

$$w_n = f_c \frac{C_s}{C_o},$$

the Q of the poles and therefore the bandwidth of the PD filter $$Q = \frac{C_s}{C_Q}$$

the S-plane position of the zero (corresponding to the frequency in radians) is $$w_Z = \frac{R_{DAC}}{R_F} w_n.$$

The user may change the poles position by changing the clock frequency, $f_c$, may change the zero via the programmable DAC-resistor 47, and may change the Q of the poles by digitally programming the programmable resistor 82.

Figure 8:
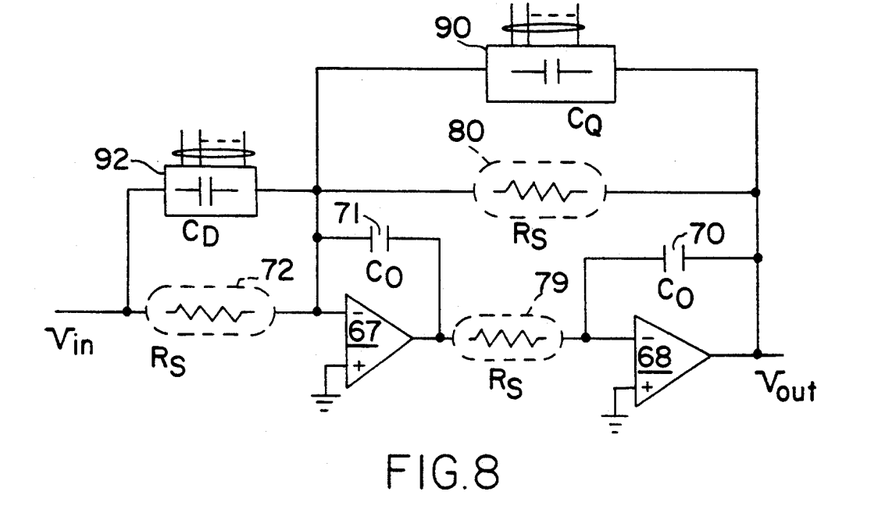
FIG. 8 shows a third PD circuit of this invention.
Figure 10:
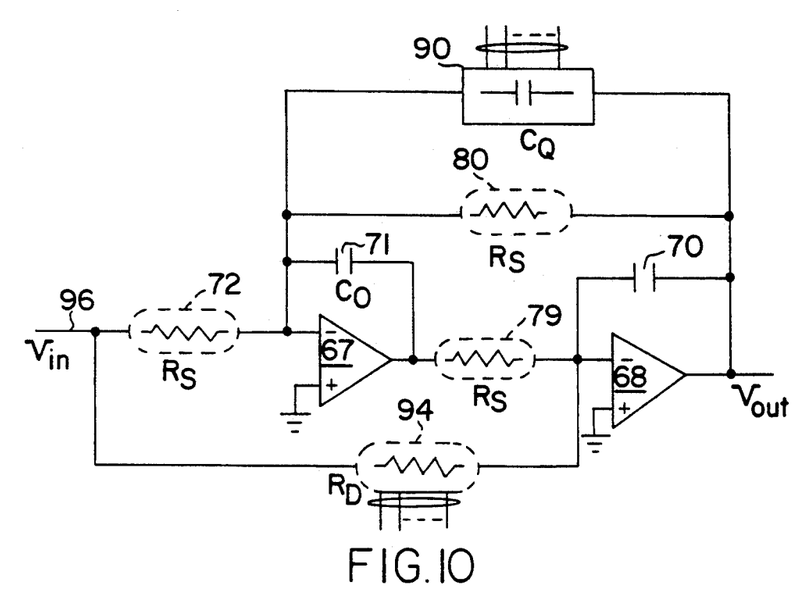
FIG. 10 shows a fourth PD circuit of this invention.

The second, third and fourth embodiments, namely those shown in FIGS. 6, 8 and 10, have in common with the first embodiment shown in FIG. 4 the operational amplifiers 67 and 68, the capacitors 71 and 70, and the switched-capacitor resistors, 72, 79 and 80. The programmable DAC-resistor 47 substitutes in the circuit of FIG. 4 for one of the two digitally programmable capacitor arrays employed in each of the next three embodiments depicted in FIGS. 6, 8 and 10.

Figure 7:
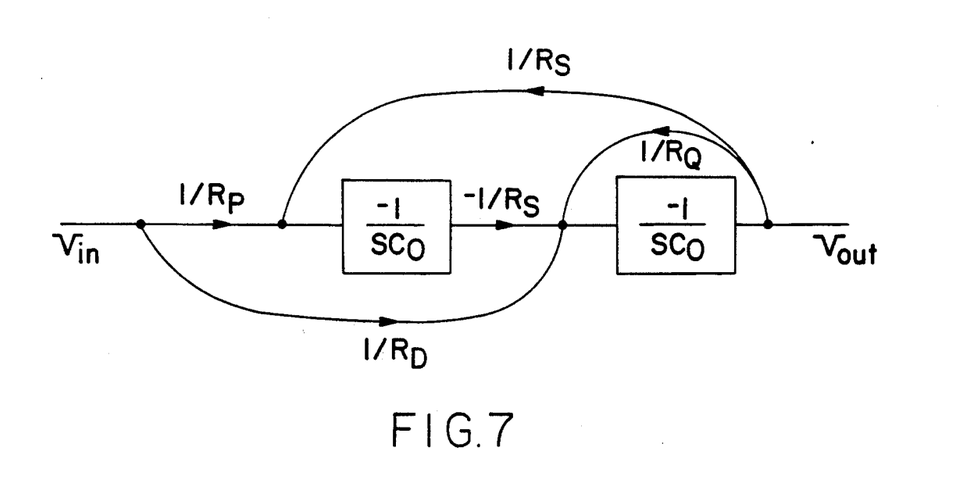
FIG. 7 shows a flow diagram corresponding to the PD of FIG. 6.

In the second embodiment of FIG. 6 a programmable switched-capacitor resistor 86, of value $R_Q$, is connected in parallel with the capacitor 70, for determining programmably the Q of the poles; and a programmable switched-capacitor resistor 88, of value $R_D$, determines the S-plane position of the zero. The PD transfer function derived by reference to the flow diagram of FIG. 7 is $$\frac{V_{out}}{V_{in}} = -\frac{\left[f_c \frac{C_s}{C_o}\right]^2}{\frac{C_P}{C_D} \cdot f_c \frac{C_s}{C_o}} \cdot \frac{S + \frac{C_P}{C_D} \cdot f_c \frac{C_s}{C_o}}{S^2 + \frac{f_c \frac{C_s}{C_o}}{\frac{C_s}{C_Q}} S + \left[f_c \frac{C_s}{C_o}\right]^2}$$

wherein the position (corresponding to the frequency in radians) of the poles in the S-plane, $$w_n = f_c \frac{C_s}{C_o},$$

the Q of the poles and therefore the bandwith of the PD filter $$Q = \frac{C_s}{C_Q}$$

and the S-plane position of the zero (corresponding to the frequency in radians) is $$w_Z = \frac{C_P}{C_D} w_n.$$

Figure 9:
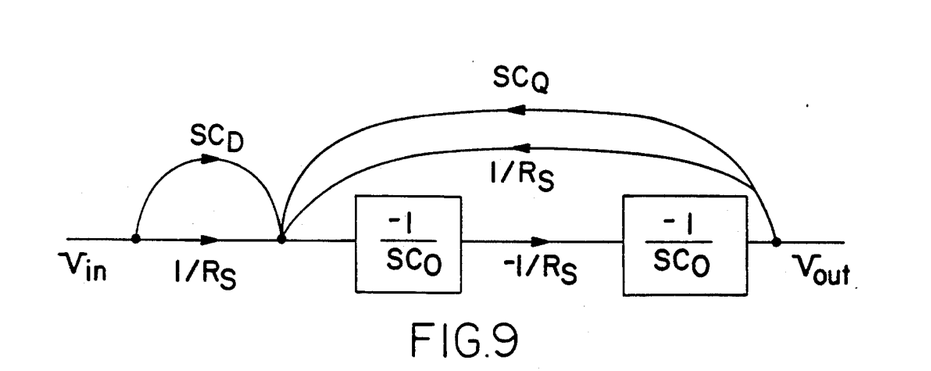
FIG. 9 shows a flow diagram corresponding to the PD of FIG. 8.

In the third embodiment of FIG. 8 a programmable capacitor array 90, of value $C_Q$, is connected in parallel with the resistor 80, for determining programmably the Q of the poles; and a programmable capacitor array 92, of value $C_D$, determines the S-plane position of the zero. The PD transfer function derived by reference to the flow diagram of FIG. 9 is $$\frac{V_{out}}{V_{in}} = - \frac{\left[f_c \frac{C_S}{C_o}\right]^2}{\frac{C_o}{C_D} \cdot f_c \frac{C_S}{C_o}} \cdot \frac{S + \frac{C_o}{C_D} \cdot f_c \frac{C_S}{C_o}}{S^2 + \frac{f_c \frac{C_S}{C_o}}{\frac{C_o}{C_Q}} S + \left[f_c \frac{C_S}{C_o}\right]^2}$$

wherein the position (corresponding to the frequency in radians) of the poles in the S-plane, $$w_n = f_c \frac{C_S}{C_o},$$

the Q of the poles and therefore the and bandwidth of the PD filter $$Q = \frac{C_S}{C_Q}$$

the S-plane position of the zero (corresponding to the frequency in radians) is $$w_Z = \frac{C_o}{C_D} w_n.$$

Figure 11:
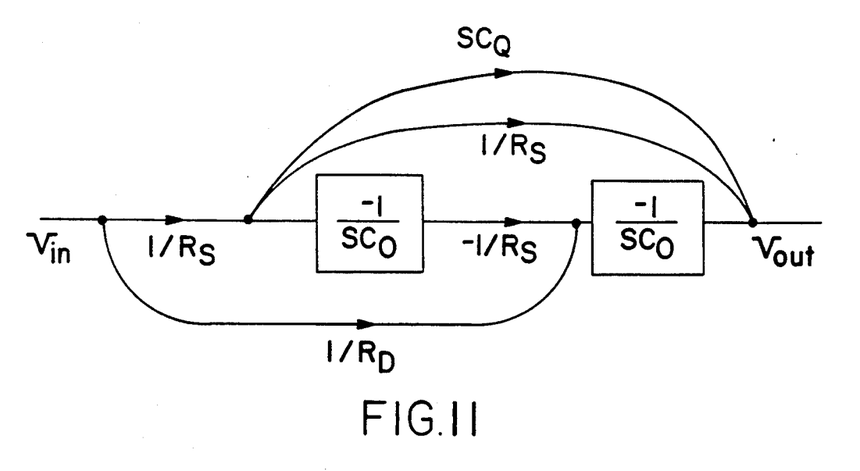
FIG. 11 shows a flow diagram corresponding to the PD of FIG. 10

In the fourth embodiment of FIG. 10 a programmable capacitor array 90, of value $C_Q$ is connected in parallel with the resistor 80, for determining programmably the Q of the poles; and a programmable switched-capacitor 94, of value $R_D$, determines the S-plane position of the zero. The PD transfer function derived by reference to the flow diagram of FIG. 11 is $$\frac{V_{out}}{V_{in}} = - \frac{\left[f_c \frac{C_S}{C_o}\right]^2}{\frac{C_S}{C_D} \cdot f_c \frac{C_S}{C_o}} \cdot \frac{S + \frac{C_S}{C_D} \cdot f_c \frac{C_S}{C_o}}{S^2 + \frac{f_c \frac{C_S}{C_o}}{\frac{C_o}{C_Q}} S + \left[f_c \frac{C_S}{C_o}\right]^2}$$

where the position (corresponding to the frequency in radians) of the poles in the S-plane, $$w_n = f_c \frac{C_S}{C_o},$$

the Q of the poles and therefore the bandwidth of the PD filter $$Q = \frac{C_o}{C_Q}$$

and the S-plane position of the zero (corresponding to the frequency in radians) is $$w_Z = \frac{C_S}{C_D} w_n.$$

The transfer function of the fourth PD compensator (FIG. 10), and in fact of all four of the compensators (FIGS. 4, 6, 8 and 10), may therefore be rewritten as $$\frac{V_{out}}{V_{in}} = \frac{w_n^2}{w_Z} \cdot \frac{S + w_n}{S^2 + \frac{w_n}{Q} + w_n^2}$$

Figure 12:
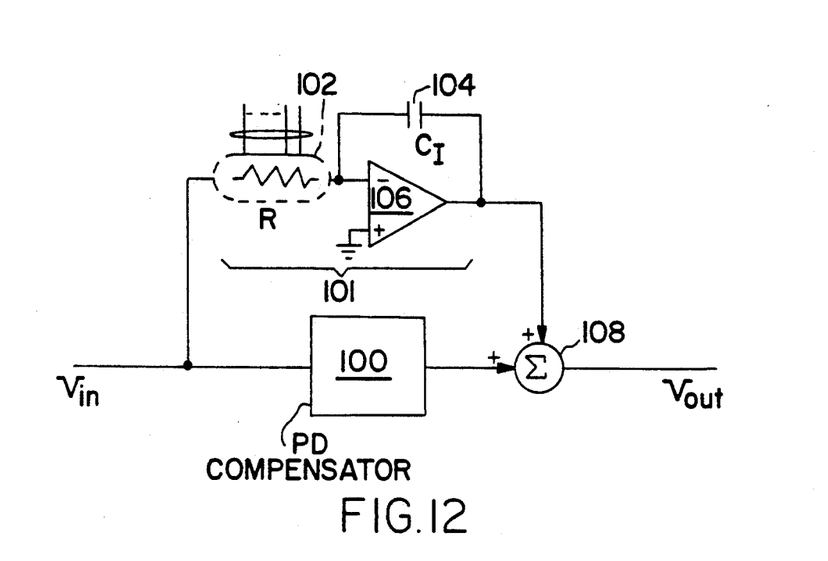
FIG. 12 shows a first PID circuit of this invention.

Referring now to the circuit of FIG. 12, one of the four PD servo compensators described above is represented by the block 100. A standard integrator circuit 101 is composed of an integrating programmable switched-capacitor resistor 102 of value R, an integrating capacitor 104 of value $C_I$, and an operational amplifier 106. The inputs of the integrator 101 and the PD compensator 100 are connected together. The outputs of the integrator 101 and the PD compensator 100 are connected respectively to the two inputs of a summer 105 for forming a proportional-integration-derivative (PID) servo compensator of the parallel type. A corresponding flow diagram for the PID compensator is shown in FIG. 13 wherein the PD compensator 100 has the transfer function PD(s) in the S-domain.

Figure 13:
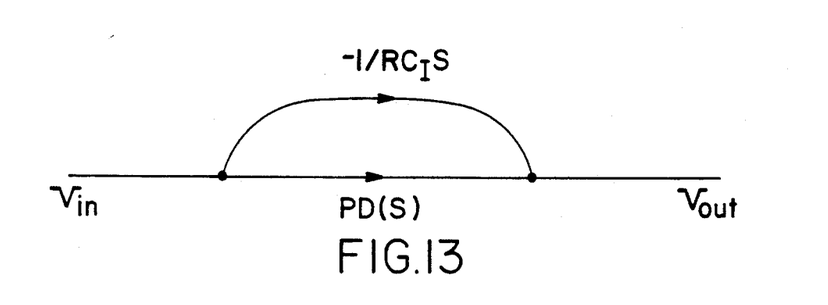
FIG. 13 shows a flow diagram corresponding ot the PID of FIG. 12.

Analysis of the circuit of FIG. 12 is assisted by use of the flow diagram of FIG. 13, which leads to $$\frac{V_{out}}{V_{in}} = PD(S) + \frac{1}{R} \cdot \frac{1}{SC_I} = PD(S) - \frac{f_c C_R}{C_I S}$$

and using, for example the above given s-plane transfer function of the fourth PD compensator (FIG. 10) leads to $$\frac{V_{out}}{V_{in}} = - \left[K_D S + K_P + K_I \frac{1}{S}\right] \frac{w_n^2}{S^2 + \frac{w_n}{Q} S + w_n^2}$$

wherein $w_n$ and Q are defined exactly as for the fourth PD compensator of FIG. 10, and wherein the constants $$K_D = \frac{C_o C_D C_I + C_R C_o^2}{f_c C_S^2 C_I},$$

$$K_P = \frac{C_s C_I + C_Q C_R}{C_s C_I}, \text{ and}$$

$$K_I = \frac{f_c C_R}{C_I}.$$

This analysis reveals the fact that the transfer function of the circuit of FIG. 12 has the essential characteristics of a PID compensator, namely it is the sum of a proportional term Kp, an integrating term $K_I/S$, and a differential term $K_D S$. The rest of the transfer function is a classical biquad filter expression consisting of the ratio of two quadratics in S.

Figure 14:
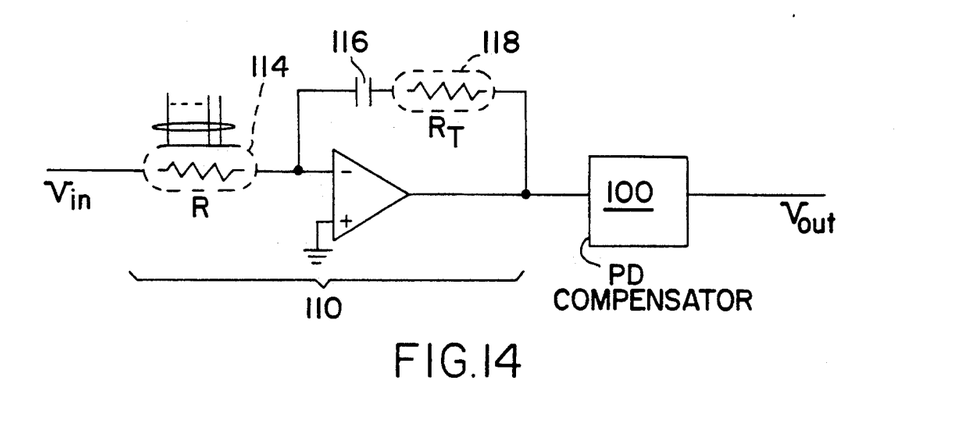
FIG. 14 shows a second PID circuit of this invention.

FIG. 14 is a series connected combination of a PD compensator and an integrator to form a PID compensator. The PD compensator 100 is any one of the four described above and the integrator 110 is composed of an operational amplifier 112, a programmable switched-capacitor resistor 14 of value R, a capacitor 116 of value $C_I$ and a switched-capacitor resistor $R_T$. A corresponding flow diagram for this PID compensator is so simple as to be of no analytical help. The transfer function of the integrator 110 is $$\frac{V_{out}}{V_{in}} = \frac{C_I R_T S + 1}{RC_I S} PD(S).$$

Again using the above given s-plane transfer function of the fourth PD compensator (FIG. 10), the series connected circuit of FIG. 14 leads to $$\frac{V_{out}}{V_{in}} = -\left[ K_D S + K_P + K_I \frac{1}{S} \right] \frac{w_n^2}{S^2 + \frac{w_n}{Q} S + w_n^2}$$

wherein $w_n$ and Q are defined exactly as for the fourth PD compensator of FIG. 10, and wherein the constants $$K_D = \frac{C_R C_D C_o}{f_c C_T C_s^2},$$

$$K_P = \frac{C_D C_R C_o C_T + CRC_I C_s^2}{C_s^2 C_I C_T}, \text{ and}$$

$$K_I = \frac{f_c C_R}{C_I}.$$

This analysis reveals the fact that the transfer function of the circuit of FIG. 12 also has the essential characteristics of a PID compensator, namely it is the sum of a proportional term $K_p$, an integrating term $K_I/S$, and a different term $K_D S$. The rest of the transfer function is again a classical low pass biquad filter expression consisting of the ratio of two quadratics in S.

The programmable PD servo compensator of this invention is especially well suited as one of the analog-signal manipulating circuits employed in the integrated circuit co-processor described in the patent application Ser. No. 07/912,387, filed concurrently herewith entitled HYBRID CONTROL-LAW SERVO CO-PROCESSOR INTEGRATED CIRCUIT, of the same inventive entity and assigned to the same assignee as is the present invention. Uses and additional advantages of this PD compensator are described in that co-filed application and that co-filed application is hereby incorporated by reference herein.

Figure 15:
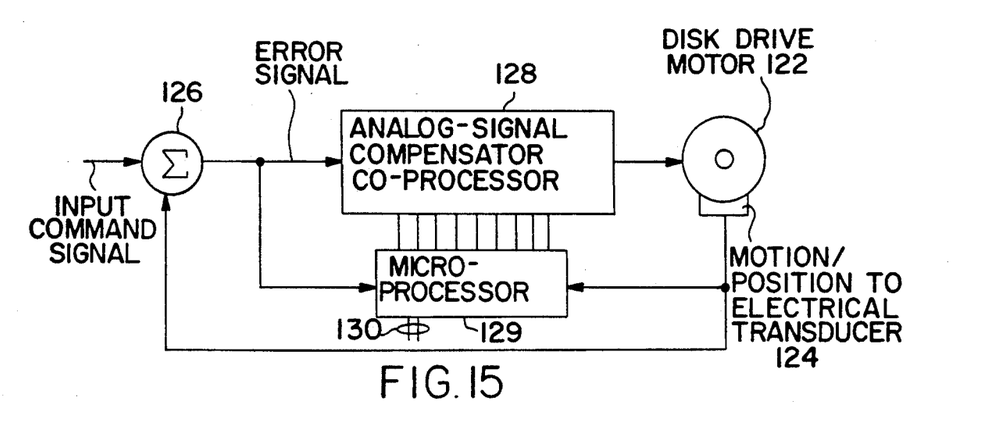
FIG. 15 shows a block diagram of an elementary servo system including an analog-signal compensator co-processor of this invention.

The servo system of FIG. 15 has a summer 126 having an input to which the analog motor command signal is delivered. The output of the co-processor 128 drives the motor 122. The motion and speed of the motor 122 is detected by the mechanical to electrical transducer 14 which is connected to a subtractive input of the summer 126 which passes the difference or error signal to the input of the co-processor. The output of the motor motion/speed signals from the transducer 124 may also be connected as shown to an input of the microprocessor 129 which typically sends digital signals to the co-processor for dynamically choosing the appropriate co-processor filter circuit and dynamically choosing the appropriate co-processor filter circuit and dynamically setting the chosen filter circuit parameters that are appropriate for the conditions of speed and velocity of the motor while accounting for the magnitude of the error signal.

The microprocessor 129 also has additional input terminals 130 through which the designer of the servo system may program the microprocessor 129 to connect within the compensator coprocessor 128 the choice of starting filter circuit and starting filter parameters, and to program the microprocessor how to react to the dynamic inputs from the error signal and from the motor.

We claim:

1. A servo system comprising
   A) a motor having an input and including a mechanical to electrical transducer having an output for producing at said transducer output a motor-motion signal;
   B) a digitally programmable analog-signal PD servo compensator having a PD input and having a PD output connected to said input of said motor, said PD compensator additionally having a plurality of PD digital control terminals;
   C) a summer having two inputs and an output, one of said summer inputs connected to said transducer output, and said summer output connected to said PD input; and
   D) a microprocessor means, having a plurality of outputs connected to said plurality of PD digital control terminals, said microprocessor means being for determining transfer function characteristics of said PD compensator;
   said digitally programmable analog-signal PD servo compensator consisting of a biquad filter having a single complex zero and a pair of conjugate complex poles, said biquad filter comprising:
   a) a first and second operational amplifier;
   b) a first capacitor connected across said first amplifier, input to output;
   c) a second capacitor connected across said second amplifier, input to output;
   d) a first switched-capacitor resistor connected between said PD input and the input of said first amplifier;
   e) a second switched-capacitor resistor connected between the output of said first amplifier and the input of said second amplifier;
   f) a third switched-capacitor resistor connected between said output of said second amplifier and said input of said first amplifier;
   g) a poles Q-programming circuit means consisting of a circuit branch including a first digitally-programmable capacitor array connected in said filter for determining the Q of said pair of poles and thus the bandwidth of said filter; and
   h) a zero programming circuit means consisting of a circuit branch including another digitally-programmable capacitor array connected in said filter for determining the S-plane position of said zero and determining the relative gains of the proportional and derivative components of the PD compensator output signal.

2. The servo system of claim 1 wherein said circuit branch of said poles Q-programming circuit means is comprised of a first digitally-programmable capacitor array, said Q-programming circuit means connected between said first amplifier input and said second amplifier output.

3. The servo system of claim 1 wherein said circuit branch of said poles Q-programming circuit means is comprised of a switched-capacitor resistor including a switching capacitor that is said first digitally programmable capacitor array, said poles Q-programming circuit means connected between said input and output of said second amplifier.

4. The servo system of claim 1 wherein said zero programming circuit means is comprised of a switched-capacitor resistor including a switched capacitor that is said another digitally programmable capacitor array, said zero programming circuit means connected between said PD input and said second amplifier input.

5. The servo system of claim 1 wherein said zero Q-programming circuit means consists of said another digitally programmable capacitor array, and is connected in parallel with said first resistor.

6. A digitally programmable analog-signal proportional-derivative (PD) servo compensator consisting of a biquad filter having a single complex zero and a pair of conjugate complex poles, said biquad filter comprising:
 a) a PD input conductor and a PD output conductor;
 b) a first and second operational amplifier;
 c) a first capacitor connected across said first amplifier, input to output;
 d) a second capacitor connected across said second amplifier, input to output;
 e) a first switched-capacitor resistor connected between said PD input conductor and the input of said first servo amplifier;
 f) a second switched-capacitor resistor connected between the output of said first amplifier and the input of said second amplifier;
 g) a third switched-capacitor resistor connected between said output of said second amplifier and said input of said first amplifier;
 h) a poles Q-programming circuit means consisting of a circuit branch including a first digitally-programmable capacitor array connected in said filter for determining the Q of said pair of poles and the bandpass of said filter; and
 i) a zero Q-programming circuit means consisting of a circuit branch including another digitally-programmable capacitor array connected in said filter for determining the Q of said zero and determining the relative gains of the proportional and derivative components of the PD compensator output signal;
 said circuit branch of said poles Q-programming circuit means being comprised of a switched capacitor resistor including a switched capacitor that is said first digitally-programmable capacitor array, and said poles Q-programming circuit means connected between said first amplifier input and said second amplifier.

7. A digitally programmable analog-signal proportional-derivative (PD) servo compensator consisting of a biquad filter having a single complex zero and a pair of conjugate complex poles, said biquad filter comprising:
 a) a PD input conductor and a PD output conductor;
 b) a first and second operational amplifier;
 c) a first capacitor connected across said filter amplifier, input to output;
 d) a second capacitor connected across said second amplifier, input to output;
 e) a first switched-capacitor resistor connected between said PD input conductor and the input of said first servo amplifier;
 f) a second switched-capacitor resistor connected between the output of said first amplifier and the input of said second amplifier;
 g) a third switched-capacitor resistor connected between said output of said second amplifier and said input of said first amplifier;
 h) a poles Q-programming circuit means consisting of a circuit branch including a first digitally-programmable capacitor array connected in said filter for determining the Q of said pair of poles and the bandpass of said filter; and
 i) a zero Q-programming circuit means consisting of a circuit branch including another digitally-programmable capacitor array connected in said filter for determining the Q of said zero and determining the relative gains of the proportional and derivative components of the PD compensator output signal;
 said zero programming circuit means being comprised of a switched-capacitor resistor including a switched capacitor that is said another digitally programmable capacitor array, said zero programming circuit means connected between said PD input conductor and said second amplifier input.

8. A digitally programmable analog-signal proportional-derivative (PD) servo compensator consisting of a biquad filter having a single complex zero and a pair of conjugate complex poles, said biquad filter comprising:
 a) a PD input conductor and a PD output conductor;
 b) a first and second operational amplifier;
 c) a first capacitor connected across said first amplifier, input to output;
 d) a second capacitor connected across said second amplifier, input to output;
 e) a first switched-capacitor resistor connected between said PD input conductor and the input of said first servo amplifier;
 f) a second switched-capacitor resistor connected between the output of said first amplifier and the input of said second amplifier;
 g) a third switched-capacitor resistor connected between said output of said second amplifier and said input of said first amplifier;
 h) a poles Q-programming circuit means consisting of a circuit branch including a first digitally-programmable capacitor array connected in said filter for determining the Q of said pair of poles and the bandpass of said filter; and
 i) a zero Q-programming circuit means consisting of a circuit branch including another digitally-programmable capacitor array connected in said filter for determining the Q of said zero and determining the relative gains of the proportional and derivative components of the PD compensator output signal;
 said zero Q-programming circuit means consisting of said another digitally programmable capacitor array connected in parallel with said first resistor.

9. A servo system comprising
 A) a motor having an input and including a mechanical to electrical transducer having an output for producing at said transducer output a motor-motion signal;
 B) a digitally programmable analog-signal PD servo compensator having a PD input and having a PD output connected to said input of said motor, said PD compensator additionally having a plurality of PD digital control terminals;
 C) a summer having two inputs and an output, one of said summer inputs connected to said transducer output, and said summer output connected to said PD input;
 D) a microprocessor means, having a plurality of outputs connected to said plurality of PD digital control terminals, said microprocessor means being for determining transfer function characteristics of said PD compensator;

said digitally programmable analog-signal PD servo compensator consisting of a biquad filter having a single complex zero and a pair of conjugate complex poles, said biquad filter comprising:
a) a first and second operational amplifier;
b) a first capacitor connected across said first amplifier, input to output;
c) a second capacitor connected across said second amplifier, input to output;
d) a first switched-capacitor resistor connected between said PD input and the input of said first amplifier;
e) a second switched-capacitor resistor connected between the output of said first amplifier and the input of said second amplifier;
f) a third switched-capacitor resistor connected between said output of said second amplifier and said input of said first amplifier;
g) a poles Q-programming circuit means consisting of a circuit branch including a first digitally-programmable capacitor array connected in said filter for determining the Q of said pair of poles and thus the bandwidth of said filter; and
h) a zero programming circuit means consisting of a circuit branch including another digitally-programmable capacitor array connected in said filter for determining t he S-plane position of said zero and determining the relative gains of the proportional and derivative components of the PD compensator output signal;

E) an integrator circuit means having an integrator input and an integrator output for integrating the analog signal that may be applied to said integrator input and for generating at said integrator output the resulting integrated signal; and F) a signal summing means having two summing means inputs and a summing means output, said input said integrator connected to said PD input, said integrator output connected to one of said summing means inputs, and said PD output connected to the other of said summing means inputs, so that said PD compensator, said integrator circuit means, and said summing means taken together form a digitally programmable analog-signal proportional-integral-derivative (PID) servo compensator, and the output of said PID servo compensator is said summing means output.

10. A servo system comprising:
A) a motor having an input and including a mechanical to electrical transducer having an output for producing at said transducer output a motor-motion signal;
B) a digitally programmable analog-signal PD servo compensator having a PD input and having a PD output connected to said input of said motor, said PD compensator additionally having a plurality of PD digital control terminals;
C) a summer having two inputs and an output, one of said summer inputs connected to said transducer output, and said summer output connected to said PD input;
D) a microprocessor means, having a plurality of outputs connected to said plurality of PD digital control terminals, said microprocessor means being for determining transfer function characteristics of said PD compensator;

said digitally programmable analog-signal PD servo compensator consisting of a biquad filter having a single complex zero and a pair of conjugate complex poles, said biquad filter comprising:
a) a first and second operational amplifier;
b) a first capacitor connected across said first amplifier, input to output;
c) a second capacitor connected across said second amplifier, input to output;
d) a first switched-capacitor resistor connected between said PD input and the input of said first amplifier;
e) a second switched-capacitor resistor connected between the output of said first amplifier and the input of said second amplifier;
f) a third switched-capacitor resistor connected between said output of said second amplifier and said input of said first amplifier;
g) a poles Q-programming circuit means consisting of a circuit branch including a first digitally-programmable capacitor array connected in said filter for determining the Q of said pair of poles and thus the bandwidth of said filter; and
h) a zero programming circuit means consisting of a circuit branch including another digitally-programmable capacitor array connected in said filter for determining the S-plane position of said zero and determining the relative gains of the proportional and derivative components of the PD compensator output signal;

E) an integrator circuit means having an integrator input and an integrator output for integrating the analog signal that may be applied to said integrator input and for generating at said integrator output the resulting integrated signal, said PD output being series connected to said integrator input and said PD output connected to said input of said motor via said integrator circuit means, so that said PD compensator and said series connected integrator circuit means taken together form a digitally programmable analog-signal proportional-integral-derivative (PID) servo compensator, and the output of said PID servo compensator is said integrator output.

* * * * *